Feb. 9, 1971 D. B. R. HILL 3,562,105
SLICE JET MEASURING APPARATUS
Filed May 8, 1968     2 Sheets-Sheet 1

INVENTOR.
DAVID B. R. HILL
BY
Thomas W. Lofgren

United States Patent Office 3,562,105
Patented Feb. 9, 1971

3,562,105
SLICE JET MEASURING APPARATUS
David B. R. Hill, Covington, Va., assignor to Westvaco
Corporation, a corporation of Delaware
Filed May 8, 1968, Ser. No. 727,428
Int. Cl. D21f 7/06
U.S. Cl. 162—263
6 Claims

ABSTRACT OF THE DISCLOSURE

Apparatus for positioning, in the slice jet of a paper machine headbox, a tube for either measuring the velocity of the slice jet or permitting samples of the papermaking stock to be removed from the slice jet.

BACKGROUND OF THE INVENTION

Field of the invention

A movable, adjustable support member for supporting measuring apparatus in its operative position.

Description of the prior art

It is important that the velocity of a jet of stock issuing from the slice of a papermaking machine headbox be substantially constant at all points across the width of the headbox. One method of measuring the velocity is to insert a pitot tube in the slice jet at various points across the headbox to measure the velocity of the slice jet at those points. The impact of the slice jet on the pitot tube is measured by any convenient pressure registering apparatus and the pressure reading obtained related mathematically to a particular velocity. For a complete discussion of the use of pitot tubes in measuring liquid velocities see "Velocity Profile Measurements and a Phenomenological Description of Turbulent Fiber Suspension Pipe Flow," Mih and Parker, the Journal of the Technical Association of the Pulp & Paper Industry, TAPPI, vol. 50, No. 5, page 237 (May 1967).

It is also important that the consistency of the papermaking stock be substantially uniform across the width of the headbox. It is desirable therefore, to have some means of removing samples from the slice jet at various points across its width for subsequent laboratory evaluation of the consistency of the stock at the sampling point.

However, because of the often high velocity of the slice jet, which may be in excess of 3,000 ft./min., and its position over the equally rapidly moving Fourdrinier wire, it is difficult to manually position means in the slice jet for measuring its velocity or sampling the jet at various points across its width.

SUMMARY

The instant invention provides means which may be temporarily and adjustably mounted on existing structure of most headboxes for positively positioning either a pitot tube or a sampling tube in the slice jet. Thus, a pitot tube or a sampling tube is mounted on a carriage member which is provided with means for embracing the slice adjusting rods usually found adjacent the slice of a headbox to permit the pitot or other tube to be lowered down the slice adjusting rod until it is positioned in the slice jet at the proper point. An adjustable stop member is also carried by the carriage member for engaging a portion of a headbox, such as the profile bar, to insure that the tube carried by the carriage member is properly positioned. Because both the stop member and the slice adjusting rod engaging means are adjustable, the apparatus of the present invention is adapted for use with a variety of headboxes of different sizes and shapes. Additionally, because the tube carried by the carriage member is firmly supported in the same relative position at various points across the width of the headbox, the accuracy and significance of the results obtained are greatly improved. Further, the support member is easily handled by one man and can be readily attached and removed from headboxes so that a single unit can serve for periodically measuring the velocity and consistencies of the stock of several headboxes.

DESCRIPTION OF THE PREFERRED EMBODIMENTS

Figure 1:
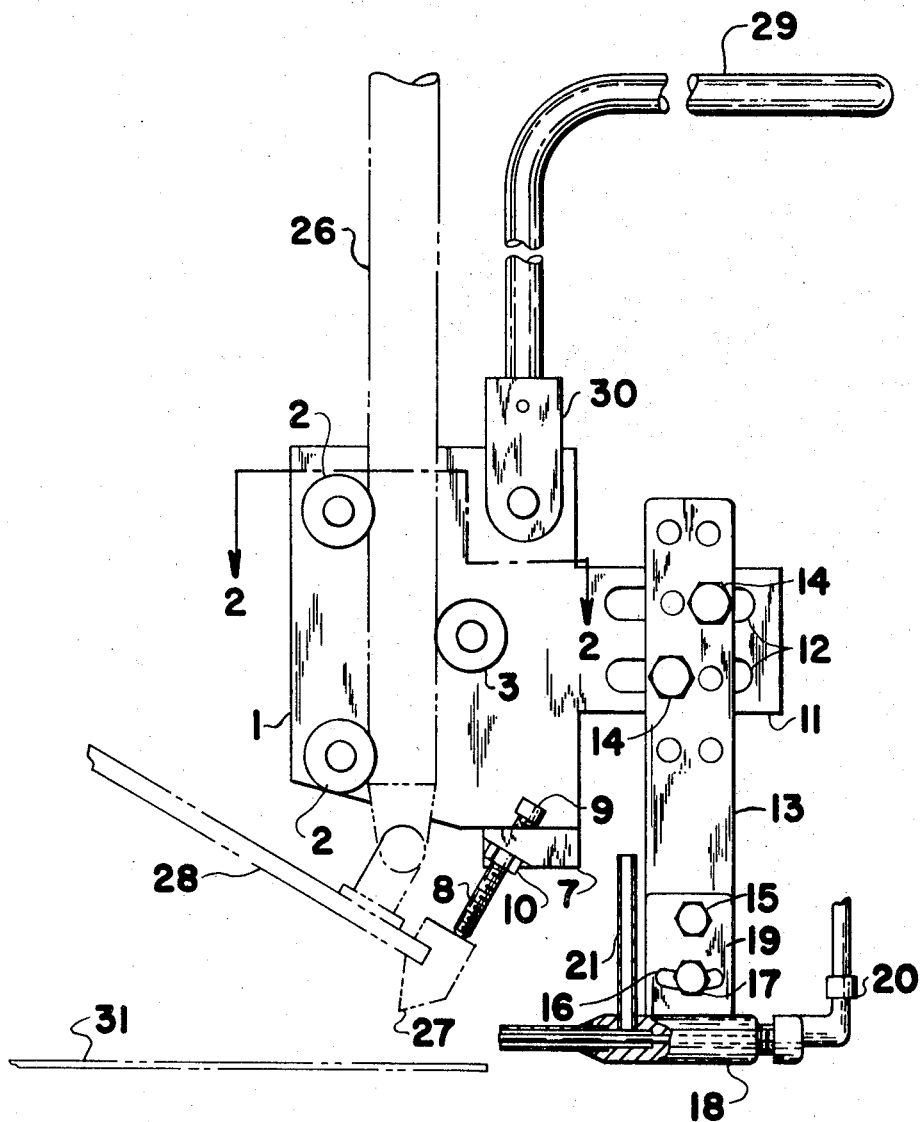
FIG. 1 of the drawings is a side elevational view showing the support member of the present invention and the portion of the headbox structure to which it is normally attached.

As shown in the drawings, the invention comprises a carriage member formed by a first flat plate member 1. Mounted on the carriage member is slice adjusting rod engaging means comprising a pair of grooved rollers 2 and a third, diametrically opposed roller 3, which may be similarly grooved or of constant diameter, as shown.

Figure 2:
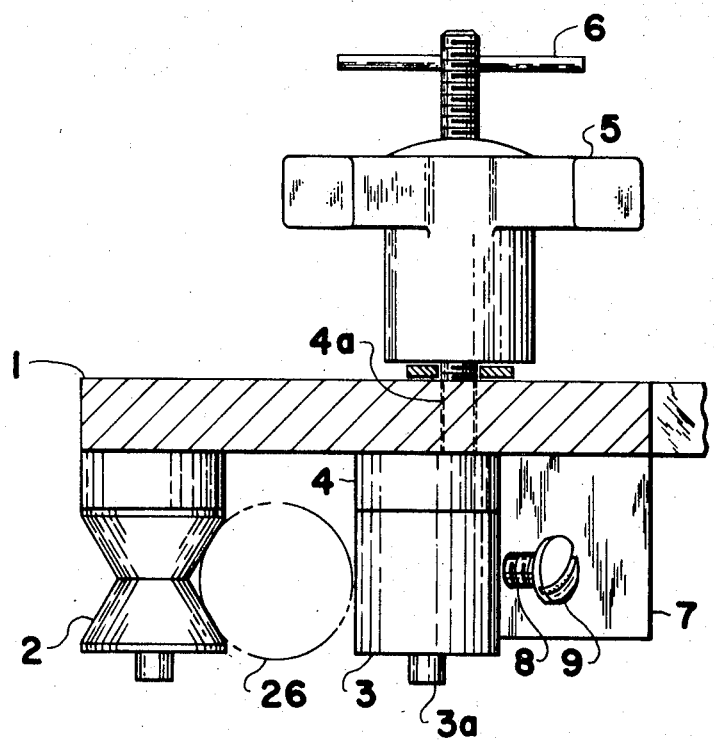
FIG. 2 is a sectional view taken on line 2—2 of FIG. 1.

As probably best seen in FIG. 2, the roller 3 is rotatably mounted on a stub shaft 3a protruding from the base member 4. The base member 4 is, in turn, eccentrically and rigidly mounted on a shaft member 4a, which extends through the plate 1 at a point equally distant from each of the rollers 2 and is threaded on its opposite end to receive a similarly, but internally, threaded hand wheel 5. The shaft 4a also carries an additional handle 6 rigidly mounted at its outer end for turning the shaft member about its axis and causing the roller 3 to move towards or away from the pair of grooved rollers 2.

Fixed to a portion of the lower edge of the flat plate 1 is a second, smaller plate member 7 which, as best seen in FIG. 2, extends perpendicularly outwardly from the plane of the flat plate 1. A threaded stop member 8 having a tool engageable end 9 and a lock nut 10 passes diagonally through and threadably engages the second plate member 7.

An extension 11 of the flat plate 1 is provided with a pair of substantially horizontally extending slots 12 and a third plate member 13 is attached to the extension 11 by means of nut and bolt combinations 14 passing through the plate member 13 and the slots 12. At its lower end the plate member 13 is provided with a pair of apertures for receiving nut and bolt combinations 15 and 17. A tube member, such as the annularly purged pitot tube 18 shown, is provided with an upstanding flange member 19 having an aperture formed therein for receiving the nut and bolt combination 15 and an arcuate slot for receiving the nut and bolt combination 17.

Figure 3:
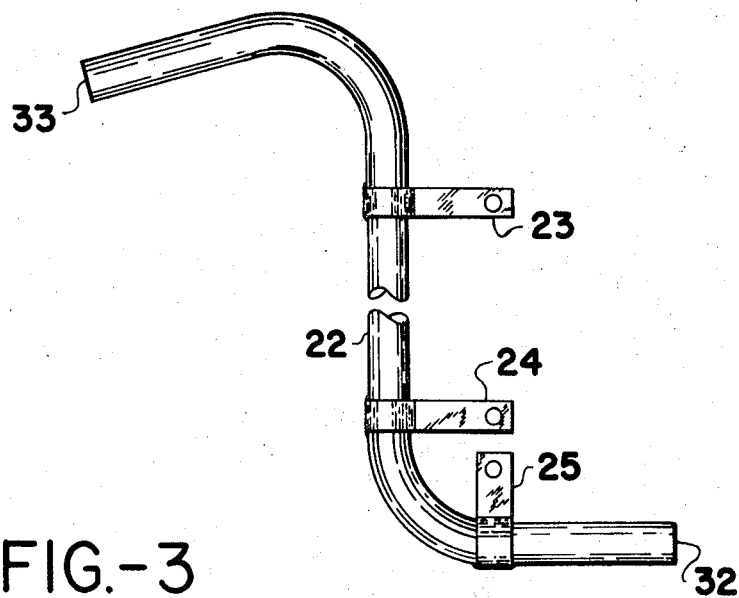
FIG. 3 is an elevational view of a sampling tube that may be attached to the support member in place of the pitot tube shown in FIG. 1.

A complete description of the annularly purged pitot tube 18, which forms, per se, no part of the present invention, may be found in the aforementioned TAPPI article. For present purposes, it is sufficient to note that the tube comprises a coupling 20 for attachment to a pressure line for transmitting the pressure in the tube to a simple pressure measuring gauge or an electrical pressure transducer. A second coupling member 21 may be connected through suitable tubing to a source of pressurized liquid for purging the annular space about the pitot tube and prevent stapling of fibers across the tube and consequent blockage thereof; all as described in the aforementioned article.

Where it is desired to merely take samples of the stock issuing from the slice, the apparatus shown in FIG. 3 may be substituted for the pilot tube 18 shown in FIGS. 1 and 2. Thus, in place of the annularly purged pitot tube 18 the reversely bent tube 22 having flanges 23, 24, and 25 mounted thereon by welding or the like, may be used in place of the pitot tube assembly 18.

When it is desired to make slice velocity measurements, the hand wheel 5 is loosened to permit the roller 3 carried by the eccentrically mounted base member 4 to be rotated by means of the handle 6 away from the pair of grooved rollers 2. The carriage member is then mounted on a slice adjusting rod 26 with the grooved rollers 2 engaging one portion of the rod. The roller 3 is then shifted toward the rollers 2 by turning the handle 6 until the roller 3 firmly engages a diametrically opposed portion of the slice adjusting rod 26. The roller 3 is then locked in this position by means of the hand wheel 5. The carriage member is then moved downwardly along the rod 26 until the stop member 8 engages the profile bar 27 of the slice lip 28; thereby limiting movement of the carriage member in the generally downward direction along the profile bar. If the tube 18 is not properly positioned in the slice jet at this time, the carriage member is moved upwardly along the profile bar by means of the handle 29 pivotly attached to the plate member 1 by means of the clevis 30, and the threaded stop member adjusted so that the tube will be properly positioned in the slice jet when the stop member engages the profile bar 27. Generally, it will be desirable for the center line of the tube to be coincident with the center line of the slice jet formed by the profile bar 27 and the apron 31.

As is well known to those skilled in the art, the slice adjusting rods are fairly closely spaced across the width of the headbox to permit the spacing of the profile bar from the apron to be closely controlled across the entire width of the headbox. In view of this, the velocity of the slice jet can be measured at equally closely spaced points along its width, since the carriage member carrying the tube 18 may be attached to each of the slice adjusting rods as desired.

As noted above, it will often be desirable to take samples of the stock flowing from the slice at various points across the width of the headbox. While it is possible to simply use the pitot tube 18 for this purpose by connecting the coupling 20 to an open ended tube and allowing the stock to flow into the pitot tube, through the coupling 20 and thence, into a beaker or other container, in most instances it will be desirable to use instead, a constant diameter, single walled tube such as that shown in FIG. 3 at 22. Thus, it is a simple matter to remove the nut and bolt combinations 15 and 17 and allow the tube 18 and its attached flange 19 to be removed and then attach the tube 22 by means of the flanges 23, 24, and 25 and the nut and bolt combinations 14, 15, and 17 respectively. In this configuration, when the carriage is lowered to a point where the stop member 8 abuts the upper end of the profile bar 27, the inlet end 32 of the tube 22 is positioned to receive stock issuing from the headbox slice. The operator then merely places a beaker or other convenient container beneath the outlet end 33 and collects a sample of the headbox stock for subsequent laboratory testing as desired.

From the above description it will be apparent that applicant has invented support means which may be conveniently mounted on headboxes for positively positioning a tube in the slice jet of the headbox.

While a preferred embodiment has been described for purposes of illustration it is apparent that modifications thereof will readily occur to those skilled in the art within the scope of the appended claims.

What is claimed is:
1. Apparatus for positioning a tube member in the slice jet of a headbox comprising:
   (a) carriage means;
   (b) means mounted on said carriage means for engaging a slice adjusting rod on a headbox,
      said rod engaging means permitting movement of said carriage means along said slice adjusting rod toward and away from such slice jet;
   (c) means for mounting a tube member on said carriage means in a position spaced from said rod engaging means in the direction of such slice jet; and
   (d) means for limiting movement of said carriage means along said slice adjusting rod in said direction to establish the position of said tube member relative to such slice jet.
2. The apparatus of claim 1 wherein said rod engaging means comprises:
   (a) first means for engaging a first portion of said slice adjusting rod;
   (b) second means for engaging a second portion of said slice adjusting rod diametrically opposite said first portion; and
   (c) means mounting said first and second slice adjusting rod engaging means on said carriage for relative movement toward and away from each other.
3. The apparatus of claim 1 wherein:
   (a) said means for limiting movement of said carriage means along said slice adjusting rod is adjustable.
4. The apparatus of claim 3 wherein:
   (a) said rod engaging means comprises rollers for engaging opposite sides of said slice adjusting rod.
5. The apparatus of claim 3 wherein:
   (a) said adjustable means for limiting movement of said carriage means along said slice adjusting rod comprises a screw threaded member mounted on said carriage means and positioned to engage a portion of a headbox on which said carriage means is mounted.
6. Apparatus for positioning a tube member in the slice jet of a headbox comprising:
   (a) a first plate member;
   (b) a pair of grooved rollers rotatably mounted on said first plate member for engaging a slice adjusting rod on such headbox;
   (c) a shaft member extending through said first plate member at a point spaced equally distant from each of said grooved rollers;
   (d) a base member rigidly and eccentrically attached to said shaft member on the same side of said first plate member as said grooved rollers;
   (e) a portion of said shaft member on the opposite side of said first plate member being threaded;
   (f) an internally threaded handwheel engaging said threaded portion of said shaft;
   (g) means for turning said shaft about its axis;
   (h) a stub shaft mounted on said base member;
   (i) a third roller rotatably mounted on said stub shaft;
   (j) a second plate member fixed to said first plate mem- ber and extending perpendicularly outwardly from the plane of said first plate member;
(k) a threaded stop member extending diagonally through said second plate member;
(l) a third plate member attached to said first plate member;
(m) a tube member having flange means attached thereto;
(n) said flange means being attached to said third plate member; and
(o) a handle pivotally attached to said first plate member by means of a clevis at a point on said first plate member spaced from said second plate member.

References Cited

UNITED STATES PATENTS

| | | | |
|---|---|---|---|
| 2,733,035 | 1/1956 | Rocheleau | 248—286X |
| 3,303,972 | 2/1967 | Van Loben Sels | 248—286X |
| 3,399,565 | 9/1968 | Schmaeng | 162—263X |
| 3,464,887 | 9/1969 | Salomn | 162—263 |

REUBEN FRIEDMAN, Primary Examiner

T. A. GRANGER, Assistant Examiner

U.S. Cl. X.R.

162—336